(12) United States Patent
Chan et al.

(10) Patent No.: US 8,065,462 B2
(45) Date of Patent: Nov. 22, 2011

(54) DATA COMMUNICATION INTERFACE AND COMMUNICATION DEVICES INCORPORATING SAME

(75) Inventors: Man Chi Chan, Hksar (CN); Chi Fai Jack Tang, Hksar (CN); Quan Long Ding, Hksar (CN)

(73) Assignee: Hong Kong Applied Science and Technology Research Institute Co., Ltd., New Territories (HK)

( * ) Notice: Subject to any disclaimer, the term of this patent is extended or adjusted under 35 U.S.C. 154(b) by 683 days.

(21) Appl. No.: 12/078,723

(22) Filed: Apr. 3, 2008

(65) Prior Publication Data

US 2010/0027523 A1 Feb. 4, 2010

Related U.S. Application Data

(63) Continuation of application No. 11/453,834, filed on Jun. 16, 2006, now abandoned.

(51) Int. Cl.
*G06F 13/20* (2006.01)
(52) U.S. Cl. ......... 710/313; 710/305; 710/306; 455/466

(58) Field of Classification Search .......... 710/301–306, 710/313; 709/248; 455/466
See application file for complete search history.

(56) References Cited

U.S. PATENT DOCUMENTS

| 7,478,188 B2* | 1/2009 | Patton ........................... 710/300 |
| 2006/0142030 A1* | 6/2006 | Coskun et al. ................. 455/466 |
| 2007/0073935 A1* | 3/2007 | Kim et al. ....................... 710/62 |
| 2007/0214286 A1* | 9/2007 | Muqattash et al. ........... 709/248 |

* cited by examiner

*Primary Examiner* — Mark Rinehart
*Assistant Examiner* — Kim Huynh
(74) *Attorney, Agent, or Firm* — Buchanan Ingersoll & Rooney PC

(57) ABSTRACT

A communication interface facilitates connection of a plurality of wireless USB compatible hosts with at least a WUSB device in a wireless USB environment at the same time. The communication interface includes a host detector that detects the presence of an active host or a plurality of active hosts, a host communicator for establishing wireless USB connection with a plurality of hosts, and a controller for causing time division multiplexed (TDM) data communication between active hosts and at least one device.

17 Claims, 14 Drawing Sheets

DATA COMMUNICATION INTERFACE AND COMMUNICATION DEVICES INCORPORATING SAME

This application is a continuation of application Ser. No. 11/453,834, filed Jun. 16, 2006.

FIELD OF THE INVENTION

The present invention relates to data communication interface and, more particularly, to data communication interface for WUSB applications and communication devices incorporating same.

BACKGROUND OF THE INVENTION

Wireless USB (WUSB) is a logical evolution of USB and has become an important standard for many applications because of its various advantages, including flexibility in deployment. The physical layer ("PHY") of WUSB is described in the Multiband OFDM Aliance (MBOA) UWB PHY specification—*"Multiband OFDM Physical Layer Specification"* (Revision 1.) Jan. 14, 2005, *WiMedia Alliance*, which is incorporated herein by reference. PHY currently supports data rates of 53.3, 80, 106.7, 160, 200, 320, 400 and 480 Mb/s and multiple channels. PHY also provides error detection and correction schemes to provide a robust communication channel. Logically, WUSB is a polled, TDMA based protocol, similar to wired USB. In a WUSB system, the host initiates all data transfers. Similar to wired USB, each transfer logically consists of three packets, namely, token, data, and handshake. To increase usage efficiency of the PHY by eliminating costly transitions between sending and receiving, hosts often combine multiple token information into a single packet. In that packet, the host indicates a specific time when an appropriate device should either listen for an OUT data packet, or transmit an IN data packet or handshake.

An important constraint of conventional WUSB applications is the limitation that there can be only a single host for a WUSB system at a specific time. Such a constraint in a conventional WUSB system means that no more than one host connections can be supported by one device simultaneously and this would mean a less-than-optimum utilisation of device resources in many instances. It will be highly desirable if such a constraint can be mitigated or alleviated.

SUMMARY OF THE INVENTION

Broadly speaking, the present invention has described a communication system comprising a plurality of hosts, at least a device and a communication interface, wherein each one of said hosts communicates with said device by data communication through said communication interface, and each one of said hosts is for assigning an address to said functional device and for initialising data transfer to said device through said communication interface; and wherein said communication interface comprises host detection means for detecting the presence of an active host or a plurality of active hosts, host communication means for establishing connection with a plurality of hosts, and a controller for causing detection of a second active host and for causing subsequent data communication with said second active host while said communication interface is in connection and in data communication with a first active host.

By implementing a system in which a second active host will be detected for data connection while the system is already in data connection or communication with a first active host, the conventional constraint of a single host in a system can be alleviated to achieve a more efficient use of resources.

In a preferred embodiment, the controller is adapted so that a plurality of WUSB hosts communicate with the communication interface on different physical channels using time division multiplexed access.

Therefore, in one aspect, this invention has provided a communication interface for connecting a plurality of wireless USB compatible hosts for communication with at least a WUSB device in a wireless USB environment, said communication interface comprising host detection means for detecting the presence of an active host or a plurality of active hosts, host communication means for establishing wireless USB connection with a plurality of hosts, and a controller for causing detection of a second active host and for causing subsequent data communication with said second active host while said communication interface is in connection and in data communication with a first active host.

In one example, each one of said active hosts is a WUSB host responsible for reserving time slots in a physical communication channel and for initiating data transfers to a device.

In another example, the controller is adapted so that the hosts and said at least one device communicate on a common wireless physical channel using time division multiplexed access. More particularly, the wireless physical channel is arranged into super-frames, each super-frame is arranged into 256 media access slots, and each said media access slot has a duration of 256 µs.

In another aspect, this invention has provided a method of connecting a plurality of wireless USB compatible hosts with at least a WUSB device in a wireless USB environment, said method comprising establishing wireless USB connection between a plurality of active WUSB hosts and said at least a WUSB device by time division multiplexed (TDM) data communication between said active WUSB hosts and said at least one WUSB device.

In yet another aspect, this invention has provided communication interface circuitry for connecting a plurality of wireless USB compatible hosts and at least one WUSB device.

In a preferred embodiment, data communication between said active hosts and said at least one device is by time division multiplexing (TDM). The use of a TDM scheme will facilitate the sharing of a WUSB device among a plurality of WUSB hosts at the same time. More particularly, the utilisation of a TDM based data exchange scheme or mechanism as an intermediary between a plurality of WUSB hosts and a WUSB devices alleviates the constraint imposed by a conventional WUSB system in which one a single host can operate at a specific time.

To facilitate connection of a plurality of WUSB hosts with a WUSB functional device, the controller is further adapted or configured to detect for connection with a second host when said communication interface is already connected with a first host.

According to a preferred embodiment of the present invention, the controller is adapted to cause said host detection means to detect for a second active host for data communication with said host communication means when said communication interface is already in data connection with a first active host.

For example, each one of said active WUSB hosts sends out host identifying information repeatedly, so that its presence can be detected by the device. As a further example, said host detection means of said interface can comprise means for detecting said host identifying information, and wherein, data communication link with an active host can be established upon detection of said host identification information of said active WUSB host.

As a yet another example, said controller is configured so that, upon establishing of a data communication link between said plurality of active hosts and said at least said one device, data from said plurality of hosts are sequentially communicated wherein data from a host are communicated following the host identification information of that host and before the host identification information of the same host or the next host. In such a case, data packets from the plurality of active hosts are transmitted to the device in a single super-frame. Consequently, a plurality of data packets of an active host are communicated before the host identification information of the next host is communicated on said wireless physical channel.

In an exemplary system arrangement, said active hosts and said at least one device communicate on a common wireless physical channel, and said means for detecting said host identifying information comprises further comprising means to scan said wireless physical channel for detecting presence of an active host. Preferably, said host identifying information contains packets of control and/or command information.

In another exemplary system arrangement, said communication interface further comprises a plurality of transceivers for communicating with a plurality of hosts on a plurality of physical channels. The physical channels are for example characterised by their frequency characteristics so that communication between a plurality of WUSB hosts and a WUSB device is by frequency division multiplexing (FDM).

BRIEF DESCRIPTION OF THE DRAWINGS

Preferred embodiments of the present invention will be explained in further detail below by way of examples and with reference to the accompanying drawings, in which:—

DETAILED DESCRIPTION OF THE PREFERRED EMBODIMENTS

Figure 1:
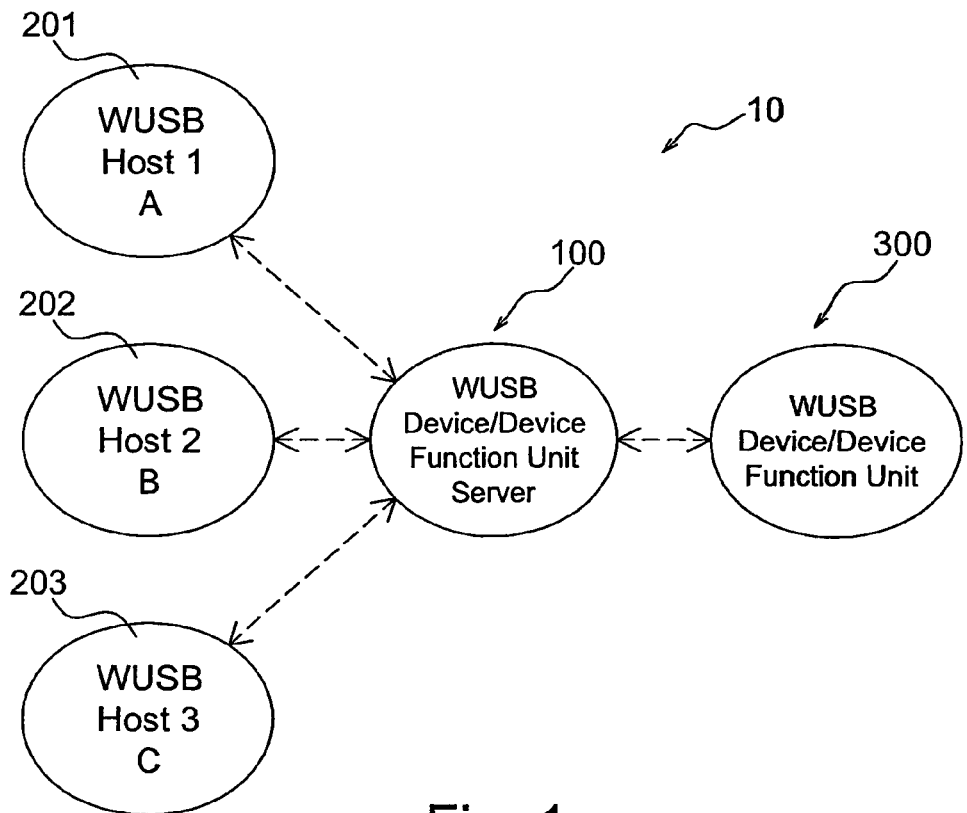
FIG. 1 is a schematic block diagram showing an exemplary WUSB system configuration comprising a plurality of WUSB hosts connected to a communication interface of this invention for operation at the same time.
Figure 1A:
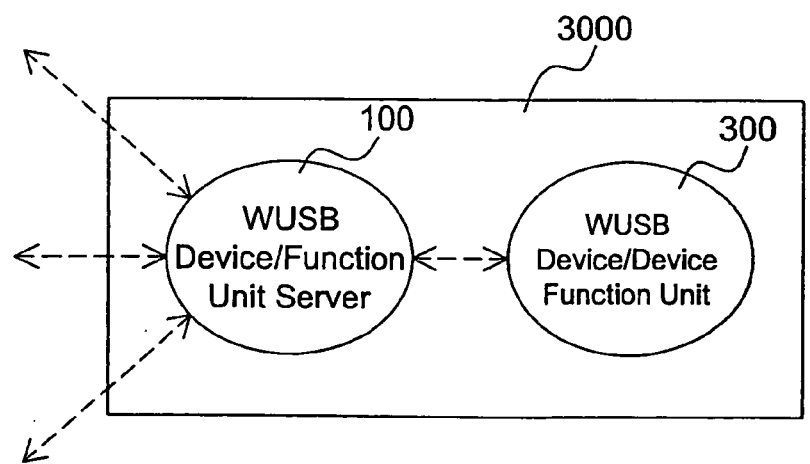
FIG. 1A is a schematic diagram showing a WUSB device comprising a communication interface (100) and a WUSB device function unit integrated together.

In FIG. 1, there is shown an exemplary WUSB system 10 comprising a WUSB device server or device function unit server 100 of this invention, a plurality of active WUSB hosts 201, 202, 203 which are denoted also as Hosts A, B and C respectively, and a WUSB device function including a device endpoint or a device endpoint function unit 300. The WUSB device function unit can be, for example, printer, data storage units, control units such as keyboards and mouse, microphone, display units such as projectors, or other WUSB device function units known from time to time. The apparatus 100 will be referred to as WUSB device server for brevity in this specification. The system 10 is connected so that the device function unit 300 can serve the 3 active WUSB hosts simultaneously. The three wireless USB hosts 201-203 are connected to the WUSB device server 100 by means of WUSB protocol. WUSB protocols are more particularly described in "Wireless Universal Serial Bus Specification" revision 1.0 dated 12 May 2005, which is available at http://www.usb.org and is incorporated herein by reference. Although this invention concerns primarily with a communication interface for multiple WUSB hosts, it will be understood without loss of generality that such a communication interface can be a stand-alone unit or a device 3000 incorporating a communication interface 100 and a WUSB device function unit 300, as shown in FIG. 1A.

In the description below, while systems for connecting a plurality of WUSB hosts to a WUSB device function unit are described, it will be appreciated by persons skilled in the art that the examples are only for ease of understanding of the invention and the application of this invention is not limited to WUSB applications but would extend to systems with hosts of similar control features and/or communication flow characteristics.

A conventional WUSB system consists of a single host and a plurality of devices operating together on the same time base and the same logical interconnect. In general, a WUSB system can be described by three definitional features, namely, WUSB interconnect, WUSB devices and one WUSB host, which are briefly described below.

WUSB

Wireless USB connects WUSB devices with the WUSB host using a "hub and spoke" model. The Wireless USB host is the "hub" at the center, and each device sits at the end of a "spoke". Each "spoke" is a point-to-point connection between the host and device. Wireless USB devices "attach" to a host by sending the host a message at a well defined time. The host and device then authenticate each other using their unique IDs and the appropriate security keys. After the host and device have been authenticated and authorized, the host assigns a unique WUSB address to the device and notifies host software about the attached device.

Devices

WUSB devices are divided into device classes such as human interface, printer, imaging, or mass storage device. A WUSB device is accessed by a WUSB address that is assigned when the device is attached and enumerated. All WUSB devices support a common access mechanism for accessing information through a control pipe. Each WUSB device additionally supports one or more pipes through which the host may communicate with the device. In addition, a WUSB device must be a well-behaved MAC (Media Access Control) Layer device. The concept of a MAC layer is defined in "*Distributed Medium Access Control (MAC) Specification for Wireless Networks*" (*Revision* 1.0). 2005, *WiMedia Alliance*, and is also currently defined as the MBOA MAC. The relevant specifications are also incorporated herein by reference. For the sake of completeness, it is also worth noting that WUSB defines three categories of devices, namely, self beaconing device, directed beaconing device, and non-beaconing device.

Figure 2:
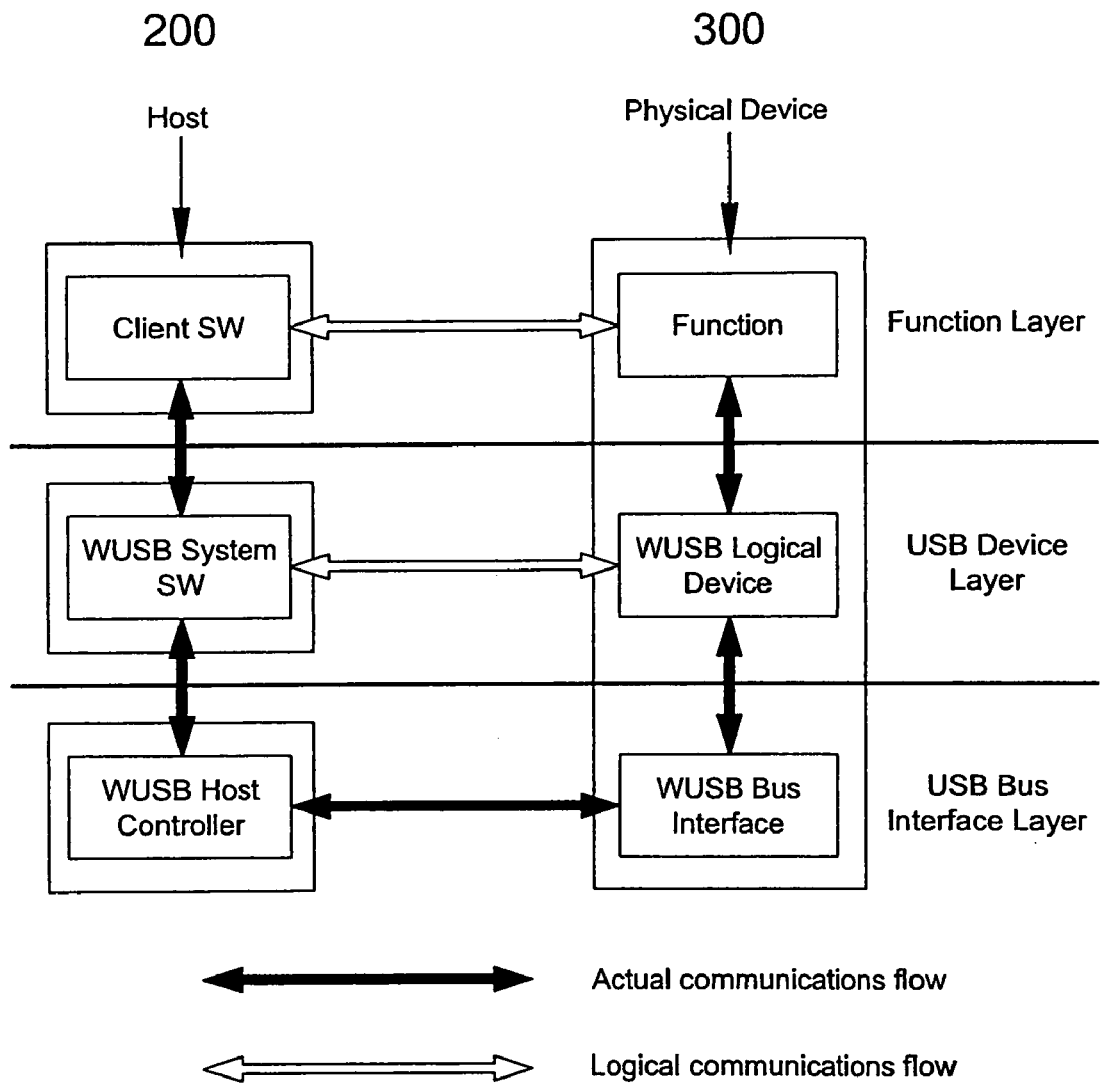
FIG. 2 shows a typical WUSB configuration illustrating the function layer, the device layer and the bus interface layers.

As shown in FIG. 2, a WUSB device logically includes the following: a) WUSB bus interface, b) WUSB logical device and c) Function. The term "Function" in the WUSB terminology means a device which provides capability to the host, such as an ISDN connection, a digital microphone, a digital camera or speakers. A device function unit in this specification means a device providing Function or for comparable purposes. A WUSB logical device appears to the WUSB system as a collection of device endpoints. A device endpoint in WUSB terminology means a uniquely addressable portion of a WUSB device that is the source or link of information in a communication flow between the host and device.

The device can either be a self-beaconing device or a directed beaconing device and is provided with a transceiver so that the device can communicate on one PHY during a super-frame.

Hosts

A WUSB hosts is a responsible MAC Layer device which is necessary to ensure that all connected USB (or WUSB) devices also behave as responsible MAC Layer devices. This may mean helping devices to beacon properly and having devices relay beacon information to the host. WUSB hosts also follow policies set forth in the WiMedia WiMCA specification (*WiMedia MAC Convergence Architecture Specification* (*Revision* 1.0). 2005. *WiMedia Alliance*, which is incorporated herein by reference).

Communication Flows

In general, the WUSB standard defines communication services between a WUSB host and attached WUSB devices. More particularly, WUSB defines processes which allow a device and a host to exchange the information required to establish a secure relationship. After a secure relationship has been established, the host and device will have the necessary information to support data encryption for wireless communications. FIG. 2 illustrates a typical WUSB data communication flow topology.

Wireless USB utilizes the MAC layer and the PHY channel. Such protocols define several access methods for accessing the MAC Layer channel, including Beacons (for discovery and some distributed control) and Distributed Reservation Protocol (DRP—for TDMA type data communications). MAC Layer channel time is organized into super-frames. Super-frames begin with a Beacon Period (BP) and are 65 milliseconds in duration. Super-frames are logically segmented into 256 Media Access Slots (MAS—each 256 μs). The MASs at the beginning of a super-frame are allocated for use by the Beacon Period. Wireless USB defines a Wireless USB Channel which is encapsulated within a set of MAC Layer super frames via a set of MAC Layer MAS reservations (DRPs). The Wireless USB Channel is a continuous sequence of linked application-specific control packets, called MMCs (Micro-scheduled Management Commands), which are transmitted by the host within MAC Layer reservations. MMCs contain host identifying information, I/O control structures and a time reference to the next MMC in the sequence (i.e. a link). A Wireless USB Channel consists of a continuous sequence of MMC transmissions from the host. The linked stream of MMCs is used primarily to dynamically schedule channel time for data communications between host applications and Wireless USB Endpoints. An MMC specifies the sequence of micro-scheduled channel time allocations (MS-CTAs) up to the next MMC within a reservation instance or to the end of a reservation instance.

The channel time between two MMCs may be idle time, where no MS-CTAs are scheduled. An MMC contains information elements necessary to identify the Wireless USB Channel, declare any MS-CTAs, or other information elements that are used for command and control. The MMC is a broadcast control packet that can be received by any WUSB device listening on the same PHY channel. A host is required to implement the MAC Layer protocol, to establish and maintain (one or more) Wireless USB Channels by allocating sequences of MAC Layer MAS reservations (i.e. DRPs).

Referring to WUSB system of FIGS. 1 and 2, the WUSB hosts are connected to a device function unit via a WUSB device function server of this invention on a common PHY. The hosts are WUSB compatible hosts with dynamic PHY channel changing mechanisms so that the hosts can dynamically schedule PHY channels upon detection of device notifications and/or other statistic information collected at MAC layer.

Figure 3:
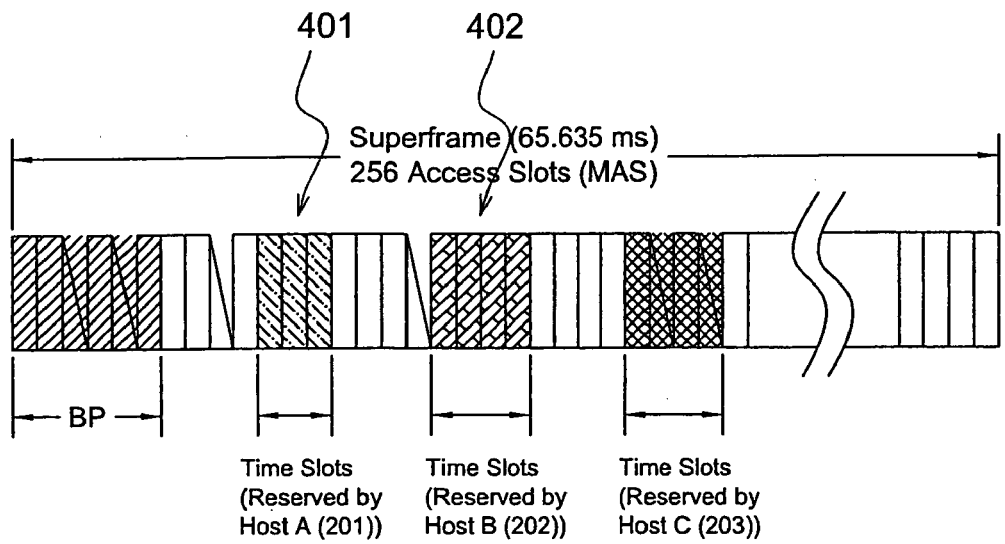
FIG. 3 is a schematic diagram illustrating a superframe with time slots reserved by 3 hosts, namely, hosts A, B and C.
Figure 3A:
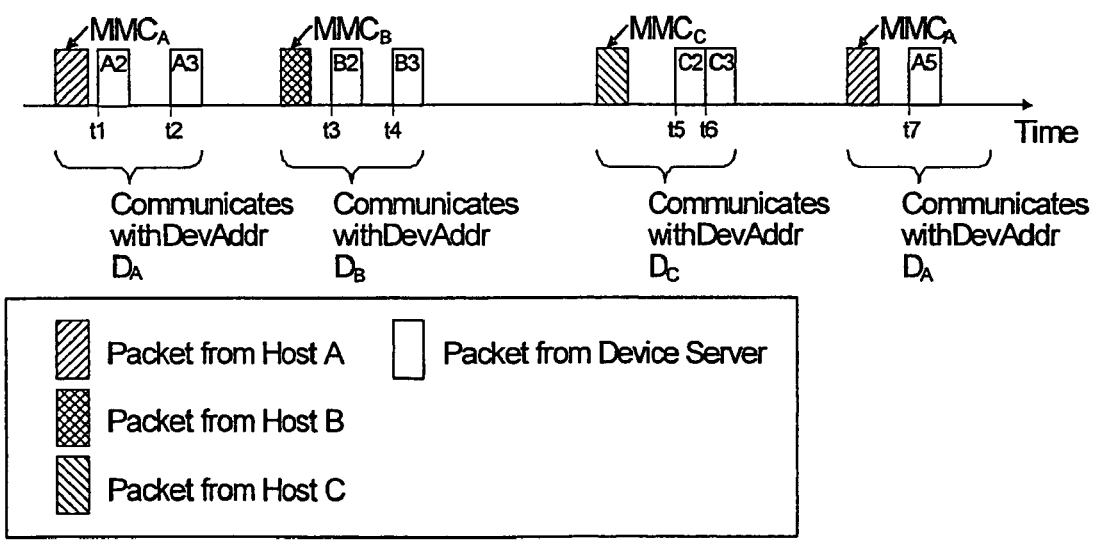
FIG. 3A is a schematic diagram illustrating exemplary data communication flow corresponding to the time diagram of FIG. 3.

Initially, the device function unit 300 is not active and hosts have reserved time slots in a super-frame, as shown in FIG. 3. The hosts 201 and 202 then send MMCs in their respective reserved timeslots at the same PHY channel to look for a device to connect, as shown in FIG. 3A. Upon detection of activating MMCs from a host, the WUSB device server 100 will be activated and the host will be recognised by the device as a detected host. The WUSB device server 100 will then start a "scan timeout" time and will monitor on a default PHY channel to scan for a host to connect.

When a MMC from a host has been received, the WUSB device server 100 will check the host identifying information to see if the MMC contains connection information of a recognised host. The connection information will typically include the host name and other secret information shared with that host. If correct host identifying information has been received, the WUSB device server will be initialised in respect of that host. On the other hand, if the devices could not find any valid connection information for a detected or recognised host, it will keep listening on the same logical PHY channel. If the WUSB device server 100 cannot find a host before the scan timeout occurs, it will switch to another logical PHY channel and repeats the host scanning activities.

If correct connection information has been received, the WUSB device server 100 will stop the scan timeout timer and sends a connect device notification to the detected host within a defined time interval as specified by the received MMC. The host and WUSB device server will then authenticate each other using their unique IDs and the appropriate security keys specified in the connection information. After the host and WUSB device server have been authenticated and authorized, the host will assign a unique USB address to the WUSB devices through bus enumeration and will notify the host software about the WUSB device server 100 to communicate with.

After a secure connection has been established with a host, the WUSB device server may continue to look for another host for connection, or wait for instructions to make another host connection, depending on input settings on the device. In this example, the device function unit 300 is connected to the WUSB hosts via connection through the WUSB device server 100 and on the same PHY channel. After a connection has been made, the first and second WUSB hosts 201, 202 would have reserved first time slots 401 and second time slots 402 in each super-frame. Specifically, the first host 201 will transfer its MMCs in time slots 401, while the second host 202 will transfer its MMCs in the second time slots 402. Thus, in each super-frame, the WUSB device server 100 will listen in the first time slots 401 for MMCs from the first host 201 and the second time slots 402 for MMCs from the second host 202. Based on the information contained in the received MMCs, the WUSB device server 100 will obtain information on when to transfer and receive data packets from the hosts 201 and 202 and will accordingly schedule data transfer to and from the respective hosts accordingly. For example, all data transfer between the device function unit 300 and the host 201 must be within the time slots 401. Likewise, the WUSB device server 100 will listen in the time slots 402 for the MMCs from the host 202, and based on the information carried in the received MMCs, the WUSB device server 100 can communicate with the host 202 in the time slot 402 in every super-frame. Therefore, in WUSB application perspectives as appreciated by persons skilled in the art, the device function unit 300 is in connection with the hosts 201 and 202 simultaneously. In such circumstances, the hosts 201 and 202 will appear to use the service or function of the device function unit 300 at the same time.

Figure 4:
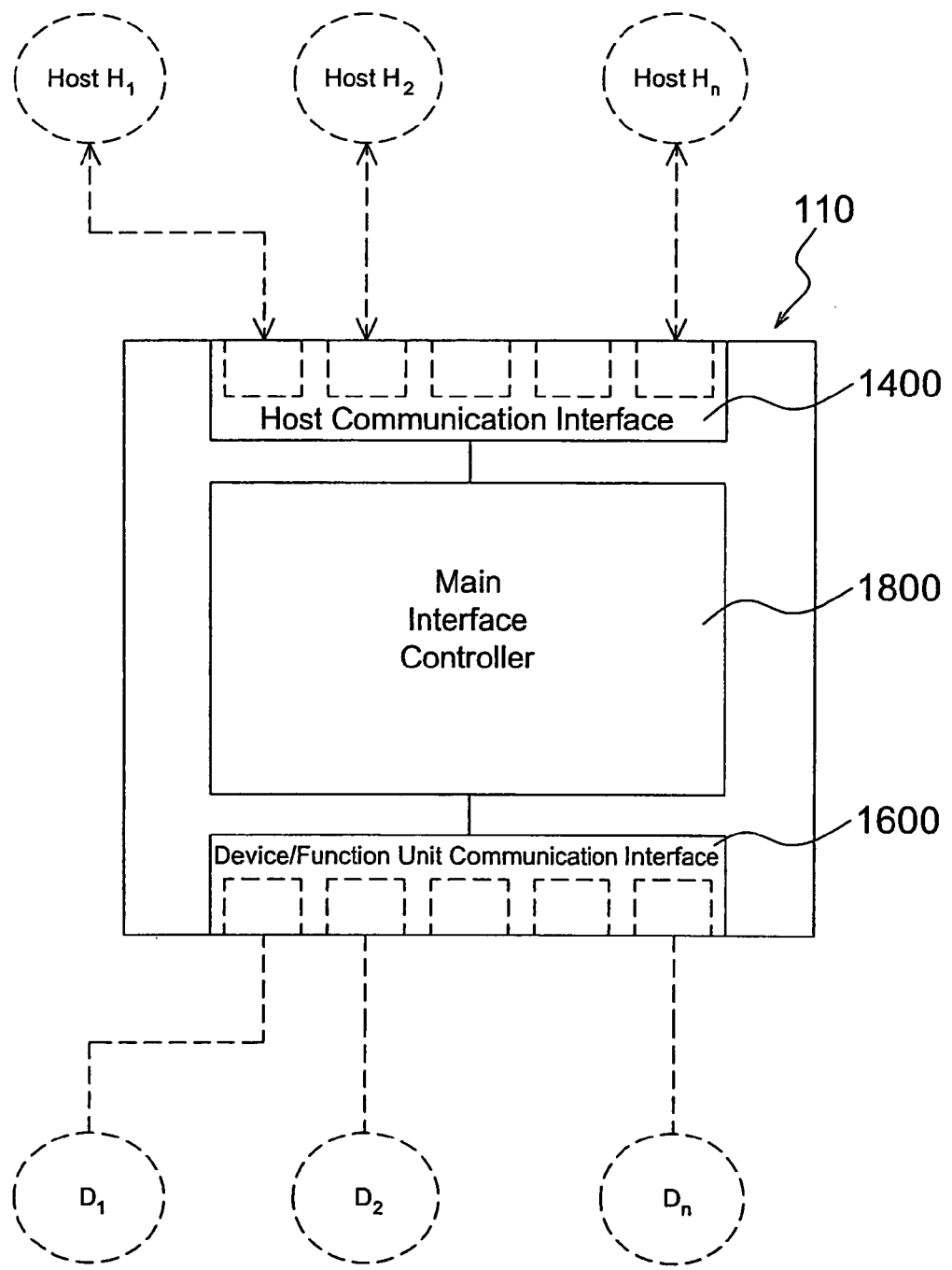
FIG. 4 is a schematic diagram showing a general arrangement of a communication interface of this invention.
Figure 5:
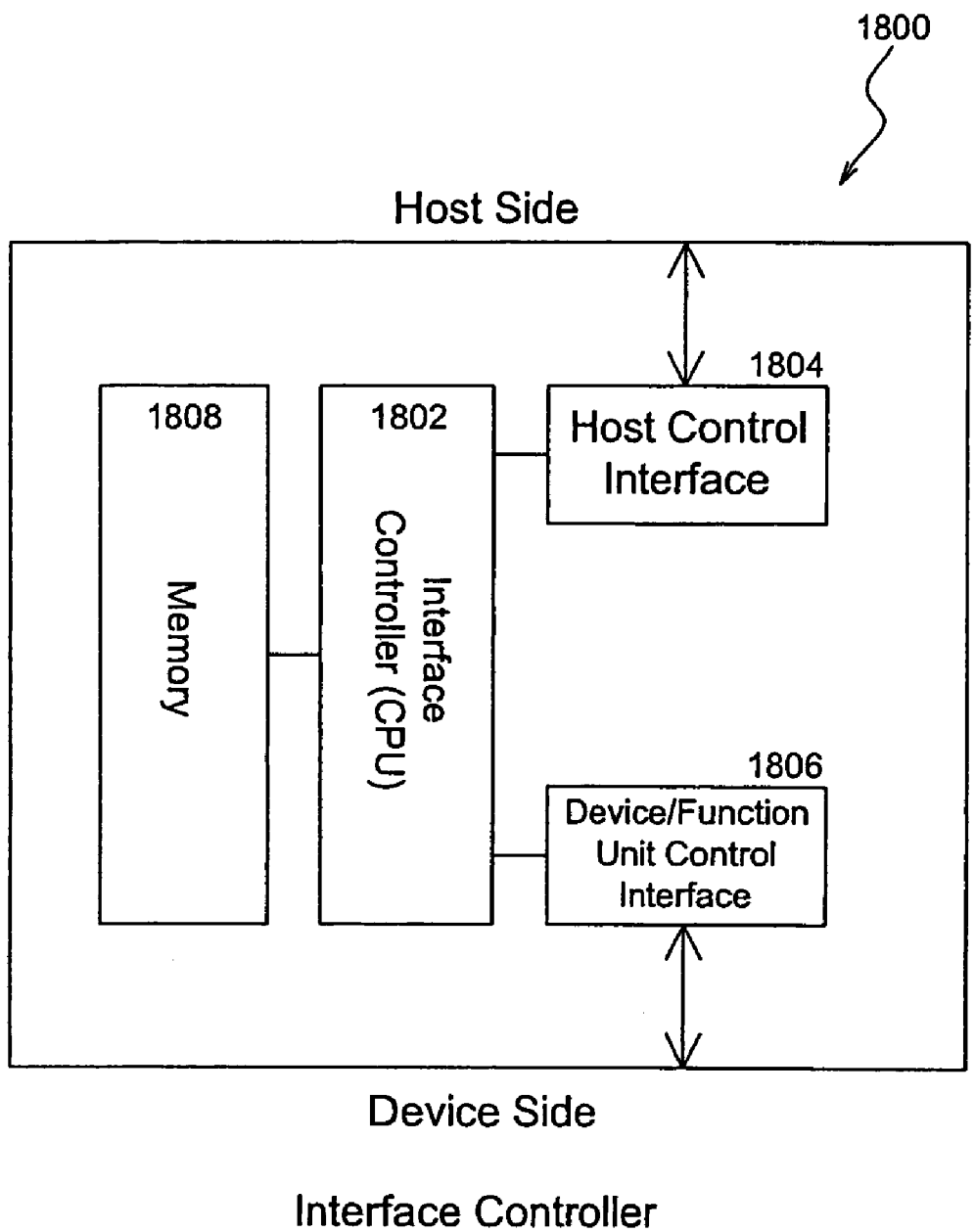
FIG. 5 is an exemplary circuit implementation of the arrangement of FIG. 4.

In FIG. 4, there is shown a general schematic block diagram of a communication interface of the present invention, as illustrated by an exemplary configuration with the communication interface connected to a plurality of WUSB hosts ($H_1$-$H_n$) and at least a Device Endpoint or a Device Function Unit ($D_1$). Broadly speaking, the communication interface 110 comprises a host communication interface 1400, which is adapted and responsible for facilitating data communication with WUSB hosts, a device communication interface 1600, which is adapted and responsible for facilitating data communication with WUSB devices, and an interface controller 1800 which is adapted and responsible for facilitating data communication between WUSB hosts and devices. A circuit block diagram for implementing the main interface controller 1800 is shown in FIG. 5. The main interface controller 1800 comprises an interface controller (CPU) 1802, a host control interface 1804, a device control interface 1806, and memory 1808.

Figure 6:
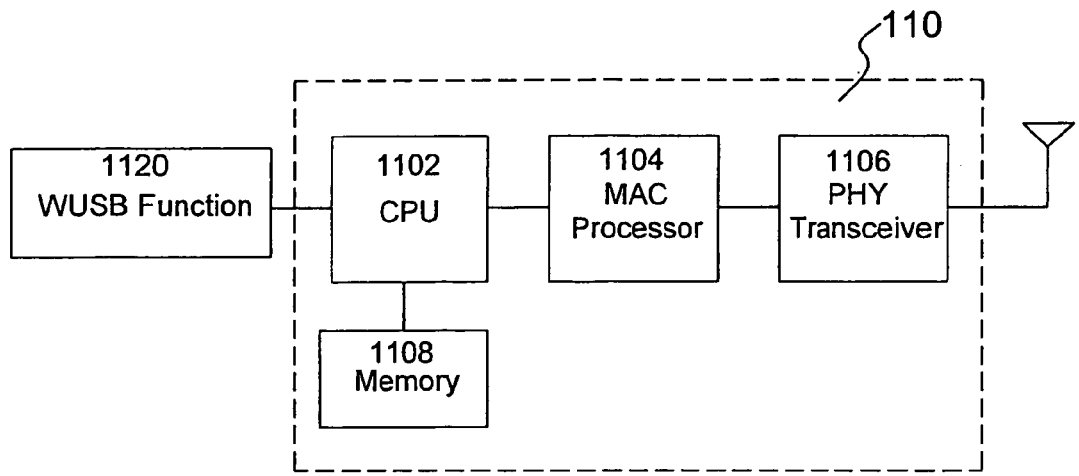
FIG. 6 is an exemplary schematic diagram illustrating an arrangement of a first preferred embodiment of a communication interface of this invention.

In FIG. 6, a schematic block diagram of a WUSB system comprising a first preferred embodiment of a communication interface 110 of the present invention is shown. The communication interface 110 will also be referred to as a WUSB device server 110 below for ease of reference. The WUSB device server 110 consists of a main controller, which is a central processor unit (CPU) 1102, a MAC processor 1104, a PHY transceiver unit 1106, a memory unit 1108, and a WUSB function module 1120. The WUSB function module 1120 is adapted to provide WUSB functions and can be regarded as part of the WUSB device of FIG. 1. Typical WUSB functions include, for example, mass data storage or printing facilities, which are useful to the connected host.

The PHY transceiver 1106 is a transceiver adapted for facilitating wireless transmission and reception of data frames to and from the hosts on the PHY The MAC processor 1104 is adapted for handling wireless communications with other MAC devices using WiMedia MAC protocols. Specifically, the MAC processor 1104 allows CPU 1102 to control data transmission and reception at well-defined time intervals in each super-frame. The memory unit 1108 is adapted for storing application images and data for operations. On power up, the CPU unit 1102 will load application images from the memory unit 1108 together with user input settings as well as executing the application image for start up and operation. For sake of simplicity, the power control unit, which is used to provide stable power supply to the function modules, is not shown. The block diagram shown is an exemplary implementation of the WUSB device server and should not be construed as any limitation to the present invention. Moreover, circuitry and operation of the MAC processor and transceiver units will be known to person skilled in the art.

Upon execution of application image in the memory unit 1108, the CPU 1102 will control and access the MAC processor to facilitate communication with each connected WUSB host over each super-frame. Furthermore, the CPU will process requests received from each connected host and will pass them to the WUSB function 1120 for processing. By controlling the way to pass the received requests to the WUSB function 1120, the CPU 1102 can facilitate service sharing amongst multiple hosts.

Figure 7:
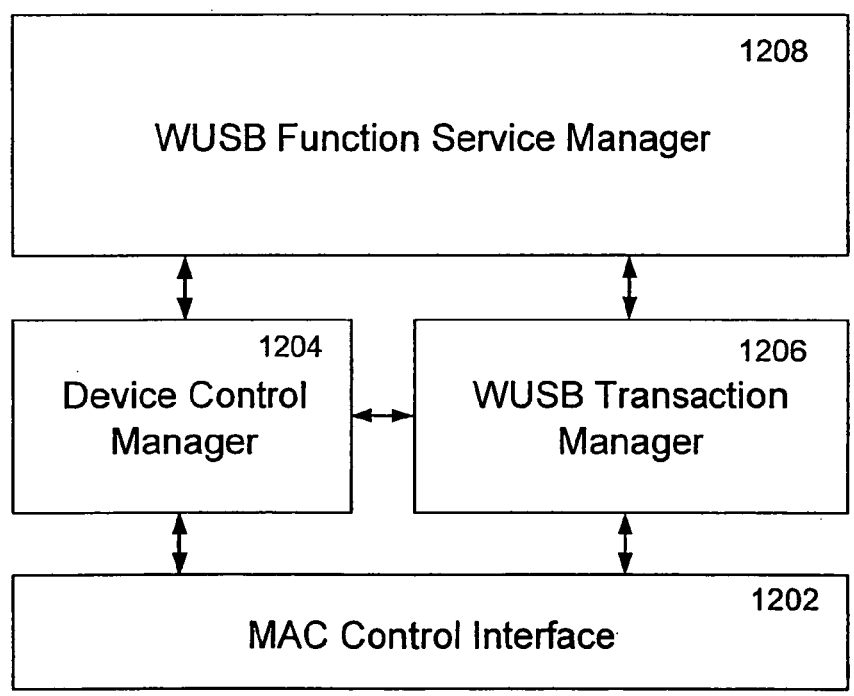
FIG. 7 is a block diagram illustrating the functional block diagrams of the CPU of FIG. 6.

Exemplary functional block diagram of the application image executed on the CPU 1102 is shown in FIG. 7. Specifically, the functional block diagram consists of four main control blocks, namely, MAC control interface 1202, device control manager 1204, WUSB transaction manager 1206 and WUSB function service manager 1208. The functions of these control blocks are described in as follows:

MAC Control Interface 1202

This control block is adapted for controlling and interfacing the underlying MAC processor to facilitate data transfer to and from a selected PHY channel. It is also responsible for periodic channel switching operations, if necessary.

Device Control Manager 1204

This device control manager control block 1204 is adapted for general device management functions, including for example, managing of WUSB host connection information, managing of device operation parameters, handling of WUSB connection association and authentication, managing of device power control modes such as sleep mode and hibernation mode, handling of WUSB device enumeration and controlling of device user panel.

WUSB Transaction Manager 1206

The transaction manager control block is adapted to handle WUSB data transfer and control for every connected host. Specifically, it is adapted to control the MAC control interface 1202 to receive and transfer packets over a selected PHY channel. The WUSB transaction manager 1206 is adapted to interpret the MMCs received and will follow the transfer schedules specified by the MMCs to cause transfer and receipt of packets for individual WUSB hosts. The transaction manager is controlled by the device control manager 1204 when handling every WUSB connection, including checking of connection information and authentication with WUSB hosts. The transaction manager is also responsible for interfacing the WUSB function service manager 1208 to forward transfer requests as well as data packets from the hosts to the addressed WUSB function endpoints for processing and to pass the transfer responses together with the requested data packets generated from the WUSB function endpoints for the addressed host.

WUSB Function Service Manager 1208

This WUSB function service manager control block is used to decode the WUSB transfer requests and the WUSB data packets received from the WUSB transaction manager 1206 and for passing the transfer requests together with the associated data packets to the WUSB function module 1120 connected to the CPU 1102 in a well-controlled way for execution. After execution, the WUSB function service manager 1208 will collect the request results together with the corresponding requested data packets from the WUSB function module 1120 and then forward them to the WUSB transaction manager 1206 for sending to the addressed WUSB hosts. The transfer requests together with the associated transfer data packets in the WUSB function service manager 1208 are first queued up in logical queues according to their sending hosts. They are then passed to the WUSB function module 1120 based on the sharing strategy the WUSB function service manager 1208 implements.

Two exemplary sharing strategies are implemented in the WUSB function service manager 1208 as an exemplary illustration. The exemplary sharing strategies are, namely, general service sharing and dedicated service sharing.

In the general service sharing mode, the WUSB device server will maintain connection with each host while communicating with them in their respective reserved time slots in each super-frame. The WUSB function service manager 1208 will pass the WUSB transfer requests and the corresponding data packets to the WUSB function unit 1120 in a FIFO (first-in-first-out) manner. It is an alternative to implement weighted fair queuing strategy on the logical transfer request queues for achieving fairness in providing service amongst multiple WUSB hosts.

In the dedicated service sharing mode, the WUSB device server will serve only one host each time. The other connected hosts will remain in connection but under flow control. The host that receives service from the WUSB device server in this mode is called an active host. When the device server operates to change the active host, it will cause flow control to the former active host and will cause release of the flow control on the new active host. These active host switching operations are managed by the device control manager 1204.

Figure 16:
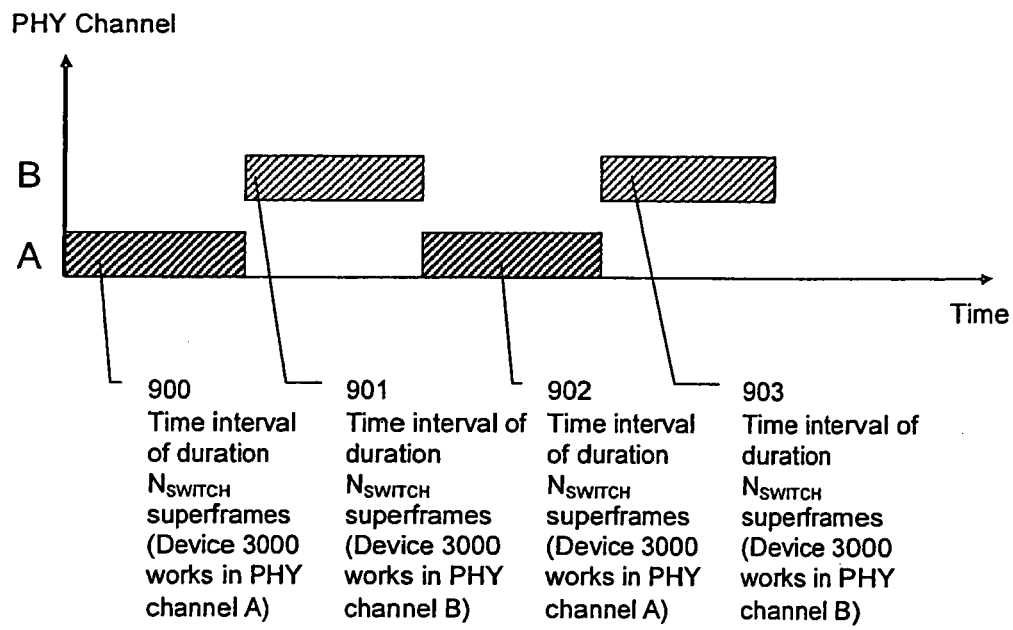
FIG. 16 is a schematic diagram showing the switching of the PHY channels of the device between PHY A and PHY B for communicating with two hosts on two separate physical channels.

As an alternative to communication with multiple hosts on the same PHY channel, this invention also permits WUSB devices to communicate with hosts on different PHY channels. Considering the former example of FIGS. 3 and 4, the WUSB device 3000 communicates with the host 201 and 202 on PHY channel A in time slots 401 and 402 on each super-frame 400, respectively. Suppose that the device 3000 is also in connection with a WUSB host on PHY channel B. To maintain communications with these hosts, the device 300 keeps switching between PHY channel A and B. As illustrated in FIG. 16, the device 3000 works on PHY channel A for $N_{SWITCH}$ superframes (time interval 900) and works on PHY channel B for the next $N_{SWITCH}$ superframes (time interval 901), and then returns to PHY channel A to work for time interval 902 and so on. The $N_{SWITCH}$ is a user defined integer and the value of ($N_{PHY\_CHANNEL} \times N_{SWITCH} \times 65.536$) milliseconds should be less than the WUSB trust timeout period to prevent the connection from being disconnected by the hosts, where $N_{SWITCH}$ is the maximum number of PHY channels the WUSB device can support to connection with.

Figure 17:
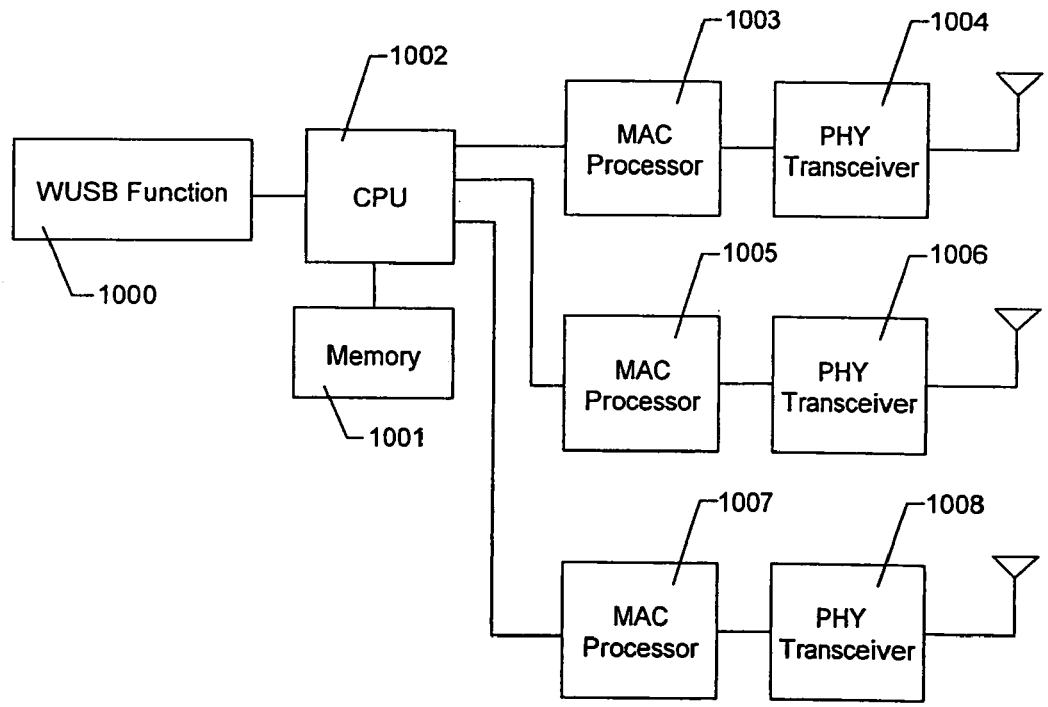
FIG. 17 is a schematic diagram showing a WUSB device server with multiple transceivers.

In addition, as an alternative to communicate with multiple hosts using one transceiver unit, this invention also supports communications with multiple WUSB hosts over more than one transceiver. That means, the WUSB device can listen on more than one PHY channel at the same time and transfer data over them simultaneously. In this way, the WUSB device can communicate with hosts on different PHY channels physically each time, not just in the logical time division manner described above. FIG. 17 illustrates a block diagram of a WUSB device server with three sets of transceiver units. The CPU 1002 in this case is connected to the MAC processors 1003, 1005 and 1007, which are connected to the PHY transceivers 1004, 1006 and 1008, respectively. Each MAC processor is responsible for controlling the connected PHY transceiver to transfer and receive packets on the selected PHY channel. The CPU 1002 communicates with each MAC processor to control the sending and receiving of WUSB frames on different PHY channels. In addition to the functions mentioned above, the device control manager 1204 in this case also needs to distribute traffic load amongst multiple transceiver units. If necessary, one transceiver unit can be reserved for communications with a host having a heavy traffic load and requests a high quality of services.

Figure 8:
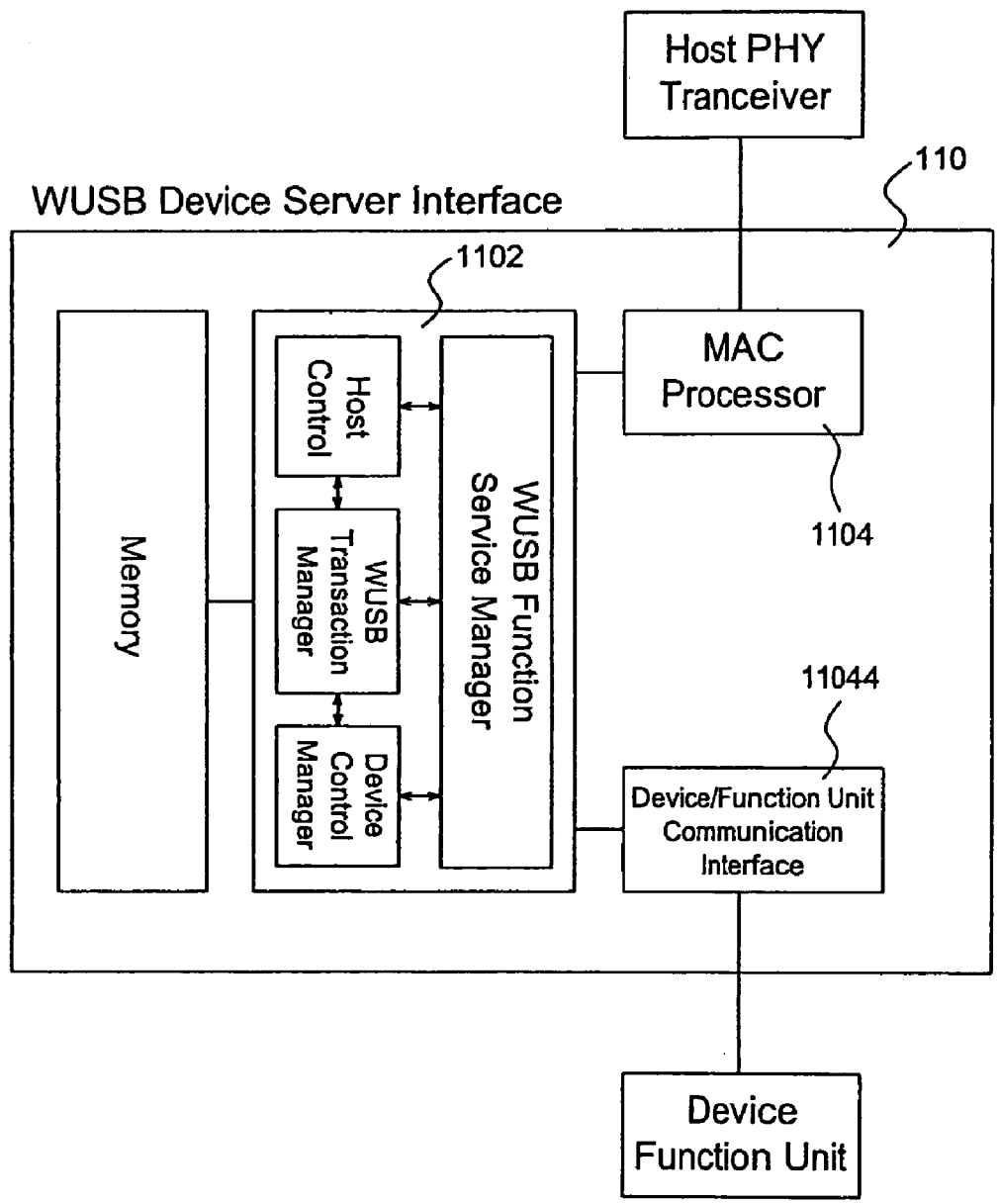
FIG. 8 illustrates an exemplary circuit implementation of the arrangement of FIG. 6.

Although functional block diagrams are used for illustration above, it will be understood that the functional blocks can be implemented on a single processor (or micro-processor) or as discrete components having specific tasks. FIG. 8 shows a circuit block diagram of exemplary circuitry for implementing the arrangement of FIG. 7 in which a device function communication interface 11044 is shown disposed intermediate the CPU 1102 and a device function unit.

Figure 9:
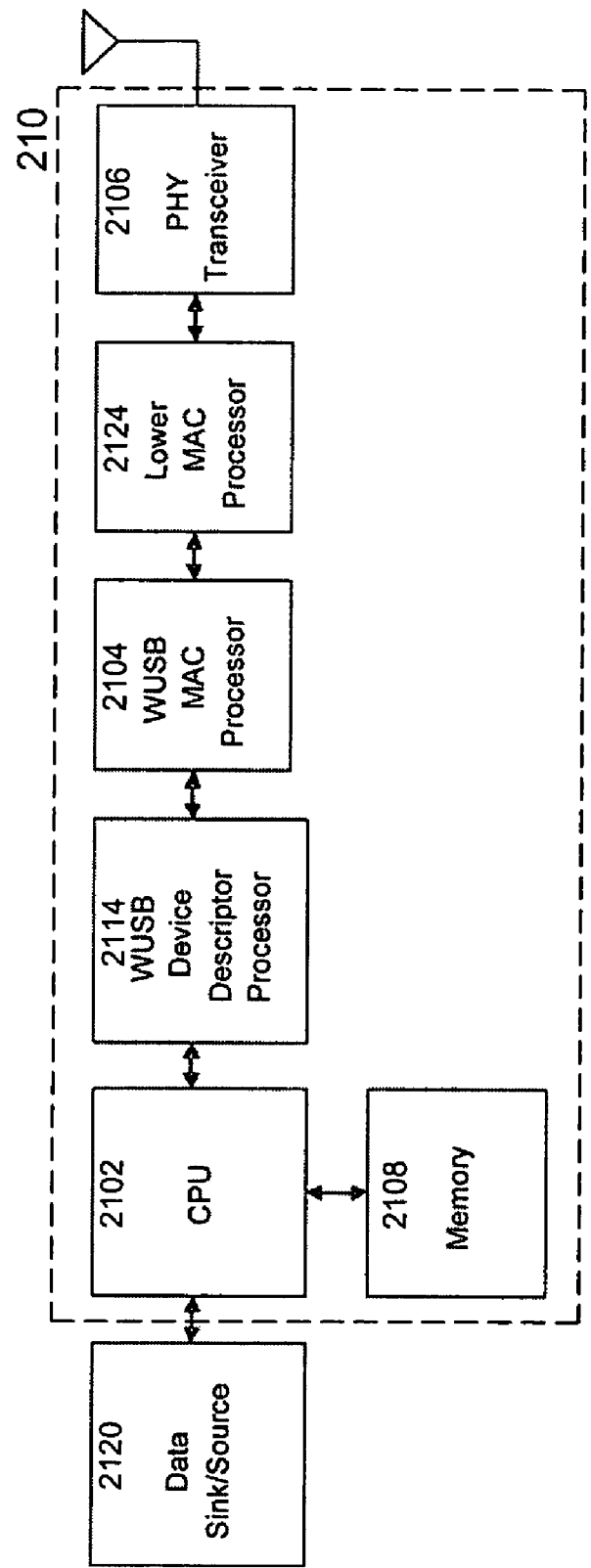
FIG. 9 is a functional arrangement of a second preferred embodiment of a communication interface of this invention.

A functional block diagram of a second preferred embodiment of the communication interface 210 of this invention is shown in FIG. 9. The communication interface 210 comprises a CPU 2102, a WUSB device descriptor processor 2114, a WUSB MAC processor 2104, a lower MAC processor 2124, and a PHY transceiver 2106. Functional features and characteristics of the individual components which are different from that of FIG. 6 are described below.

PHY Transceiver 2106

The PHY transceiver is adapted for receiving and transmitting radio frequency signals and convert the radio signal into base-band digital outputs and vice versa.

Lower MAC Processor 2124

The Lower MAC Processor is adapted to perform the following.
- Compute control fields such as CCM, CRC-32, AES-128,
- Manage keys and encryption processing,
- Control packet transmission and reception over PHY transceiver,
- Control inter-packet timing,
- Control radio transmission power.

WUSB MAC Processor 2104

The WUSB MAC Processor is adapted to perform the following.
- Decode packet header
- Address filtering
- Control packet transmission timing
- Decodes WUSB control management packets
- Handles out of order packet retrys
- Handle time-critical control and command packets and status processing
- Control lower MAC processor to switch PHY channels and do channel scan WUSB Device Descriptor Processor 2114
- Track WUSB device transfer and control status
- Store individual WUSB host connection information
- Manage device endpoints status
- Each descriptor associates with one host, and contains the connection information to that host Decodes commands and data from CPU to individual device endpoints CPU 2102
  Do fragmentation
  Manage TX/RX queuing
  Process non-time critical WUSB control packets
  Do data packing
  Handle endpoint routing
  Manage host connection setup
  Handle data transfers between data sink/source and individual device endpoints in the WUSB Device Descriptor Processor Data Sink/Source 2120
  WUSB function unit, e.g. disk storage unit (works as data source/sink), video display unit (works as data sink), camera unit (works as data source) etc., although this is typically considered as part of a device, rather than a part of the communication interface.

When relating to the embodiment of FIG. 6, it will be noted that the MAC Processor 1104 of FIG. 6 performs the functions of WUSB Device Descriptor Processor 2114, WUSB MAC Processor 2104 and Lower MAC Processor 2124 of this embodiment. In particular, it will be noted that this circuit arrangement affords the support of multiple WUSB MAC device addresses on a single same MAC chip. This is implemented by the WUSB Device Descriptor Processor and the WUSB MAC Processor. The function block WUSB Device Descriptor Processor is an information base unit with processing power and it can be implemented as a memory unit embedded in the function block WUSB MAC processor.

In a conventional MAC chipset, a MAC chip will send packets using the same MAC device address, which can be programmed to any desired value during configuration mode. In this preferred embodiment, and due more particularly to the WUSB Device Descriptor Processor and WUSB MAC Processor, the WUSB device server (communication server) is configured with the capability to send packets using different MAC device addresses (or, more specifically, WUSB MAC device address) successively.

An exemplary operation of the system of FIG. 1 will be explained below with reference to the arrangement of FIG. 9 and further with reference to the timing diagram of FIG. 3A which depicts an example of communications between a WUSB device server and three WUSB hosts Initially, radio signals of a MMC packet (A1) from Host A are received at the PHY Transceiver of the device server. The PHY Transceiver then converts the radio signals into baseband digital output. The base-band output is then sent to the Lower MAC Processor. Upon receipt of the packet A1, the Lower MAC Processor will processes the security measure parameters, for example, CRC-32, AES-128, and confirm whether the results are valid. If not, the received packet will be discarded and a failed attempt will be updated for record. If the confirmation result is positive, the received packet A1 will be delivered to the WUSB MAC Processor after removal of the lower layer MAC control overheads.

Upon reception of the packet A1, the WUSB MAC Processor will decode the packet header and its control fields. In this example, A1 is identified as a MMC packet from Host A. Consequently, the WUSB MAC processor will communicate with the WUSB Device Descriptor to get the connection information for Host A. Based on the connection information obtained, the WUSB MAC Processor will be aware that the device server has been connected to Host A. As a result, the WUSB MAC Processor reads the transmission control schedule information in this MMC packet. From this transmission control schedule information, the WUSB MAC Processor will be aware that it can send data packets to Host A at time t1 and control packets to Host A at time t2. After that, the WUSB MAC Processor will check with the WUSB Device Descriptor Processor to see if there are any data packets available or any control packets pending for transmission to Host A.

Next, the WUSB Device Descriptor Processor will send a control interrupt to the CPU to notify it that there is a data read command from the Host A. Upon decoding the command, the CPU will access the Data Sink/Source Unit and read the required data unit. The CPU will package the required data with WUSB control fields and passes the data to the WUSB Device Descriptor Processor. Due to the relatively long processing time, this WUSB data unit will not normally be transferred at time t1. Instead, it will be buffered in the WUSB Device Descriptor Processor for sending to Host A next time. For example, if there is no data packet queued in the WUSB Device Descriptor Processor for Host A at this time, the WUSB buffered data will be scheduled to send to Host A in the next data transfer schedule time t7.

In this example, data packets are available and control packets are pending in the WUSB Device Descriptor Processor for transmission to Host A. The WUSB MAC Processor will get a data packet (A2) and a control packet (A3) from the WUSB Device Descriptor Processor for sending to Host A this time. The WUSB MAC Processor will write the MAC device address assigned by Host A to the MAC device address field of these packets and passes them to the Lower MAC Processor while specifying their respective transmission time schedules t1 and t2. Upon receipt of packets A2 and A3, the Lower MAC Processor will compute control fields, like CRC, in their packet header. Next, it will controls the PHY Transceiver to deliver the packet A2 at time t1 and the packet A3 at time t2.

Next, the PHY Transceiver of the device server will receive the radio signal of the MMC packet B1. Likewise, the MMC packet B1 is first passed to the Lower MAC Processor in digital format, which is then processed and checked for validity. If validity is confirmed, the packet B1 will be delivered to the WUSB MAC Processor. The WUSB MAC Processor will decode the packet header and its WUSB control fields based on the WUSB host connection information obtained from the WUSB Device Descriptor Processor. The packet B1 will be identified as a MMC packet from Host B and the device server will then transfer data packets to Host B at time t3 and control packets at time t4. The WUSB MAC Processor will check with the WUSB Device Descriptor Processor to see if there are data packets and control packets available for Host B.

If there are data and control packets available, the WUSB MAC Processor will obtain a data packet B2 and a control packet B3 and looks up the MAC address assigned by Host B from WUSB Device Descriptor Processor. Next, the WUSB MAC Processor will write the MAC device address to the MAC packet header of the packet B2 and B3. The WUSB MAC Processor will then pass the two packets to the Lower MAC Processor and set it to transfer the two packets at time t3 and t4. After having computed the encryption and security related control fields in their packet headers, the Lower MAC Processor will control the PHY Transceiver to send the packet B2 and B3 at time t3 and t4, respectively.

Similarly, the device server will receive and decode a MMC packet C1. From its transmission control information, the device server will know that it can transfer data packets to Host C at time t5. In this example, there is more than one data packet for Host C in the WUSB Device Descriptor Processor and the duration of the transmission time interval assigned for Host C is long enough to accommodate two or more packet transmissions, the WUSB MAC Processor will get two packets (namely, C2 and C3) from WUSB Device Descriptor. After the Host C assigned MAC device addresses has been written into the relevant MAC device address field, the WUSB MAC Processor will pass the packets C2 and C3 to the Lower MAC Processor while specifying the transmission start time t5. The Lower MAC Processor will then work out the inter-packet transmission time between C2 and C3 and controls the PHY Transceiver to send out the packet C2 at time t5 and C3 at time t6.

Finally, the device server will receive another MMC packet from Host A. Similarly, the WUSB MAC Processor will obtain the transmission time schedule for the data packet to Host A, which is t7. It then gets a data packet A5 from the WUSB Device Descriptor Processor and writes the Host A assigned MAC device address to the MAC device address field of A5. After that, the WUSB MAC Processor will pass the packet A5 to the Lower MAC Processor. After the encryption and some control fields in the MAC header have been computed, the Low MAC Processor will control the PHY Transceiver to send out the packet A5 at time t7.

Figure 10:
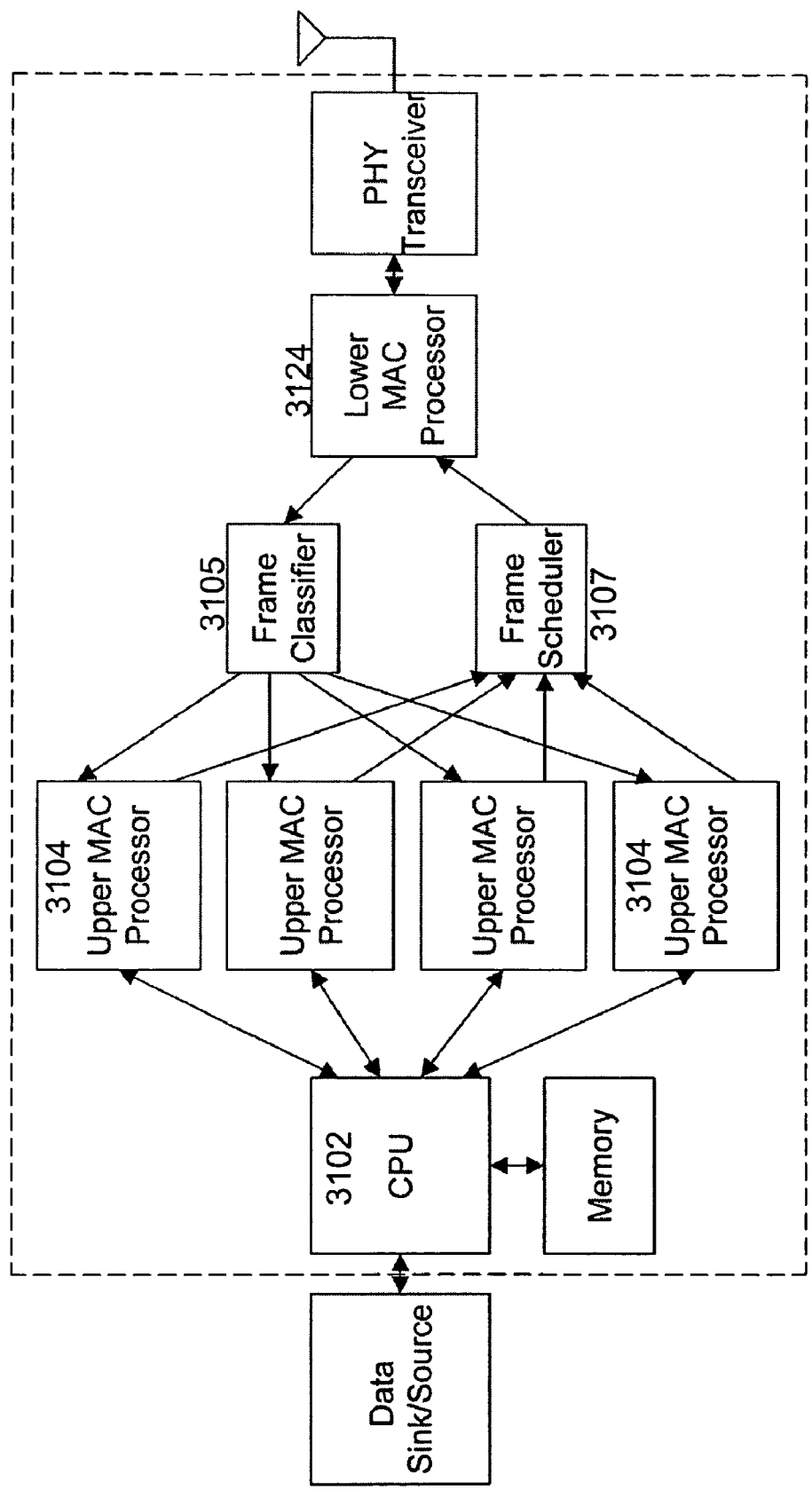
FIG. 10 illustrates a third preferred embodiment of this invention.
Figure 11:
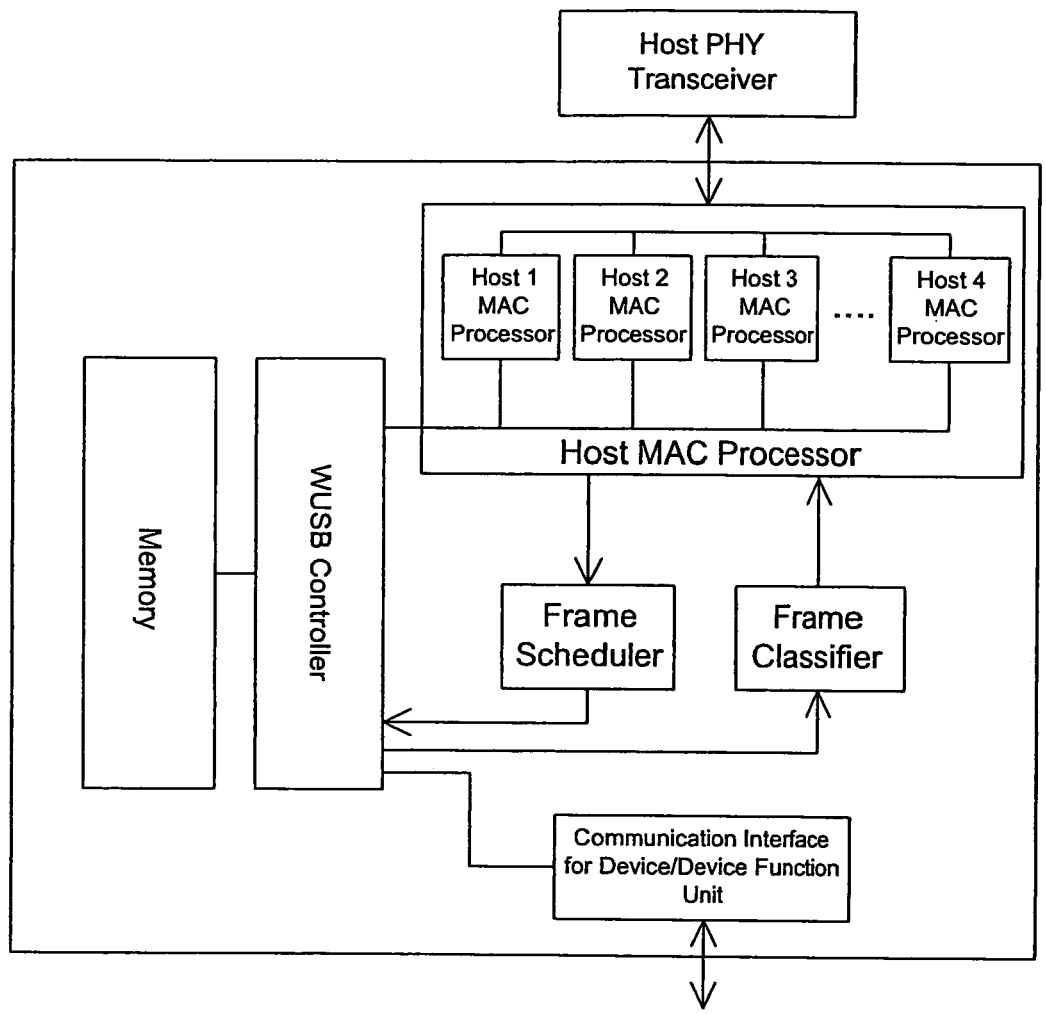
FIG. 11 is an exemplary circuit implementation of the arrangement of FIG. 10.

In FIG. 10, there is shown a third preferred embodiment of a communication interface 310 of this invention. When compared with the preferred embodiment of FIG. 9, this communication interface 310 comprises 4 upper MAC processors for communicating with 4 active WUSB hosts, and additionally, a frame classifier 3105 and a frame scheduler 3107. Each of the upper MAC processor is adapted for handling transmission time slots reservation, fragmentation and re-assembly, acknowledgement and for scheduling WUSB transactions. The Frame classifier 3105 is for decoding frames received from the lower MAC processor 3124 and for delivering the frames to the designated upper MAC processor based on the destination WUSB device address. The Frame scheduler 3107 is for delivering frames sent by the upper MAC processors 3104 and controls their transmission schedules. The CPU is for controlling WUSB connections with various WUSB hosts, data transfer control between the data sink or data source and the individual upper MAC processors 3104 and other functions similar to the CPU of the other embodiments. An exemplary circuit implementation of the embodiment of FIG. 10 is shown in FIG. 11.

Figure 12:
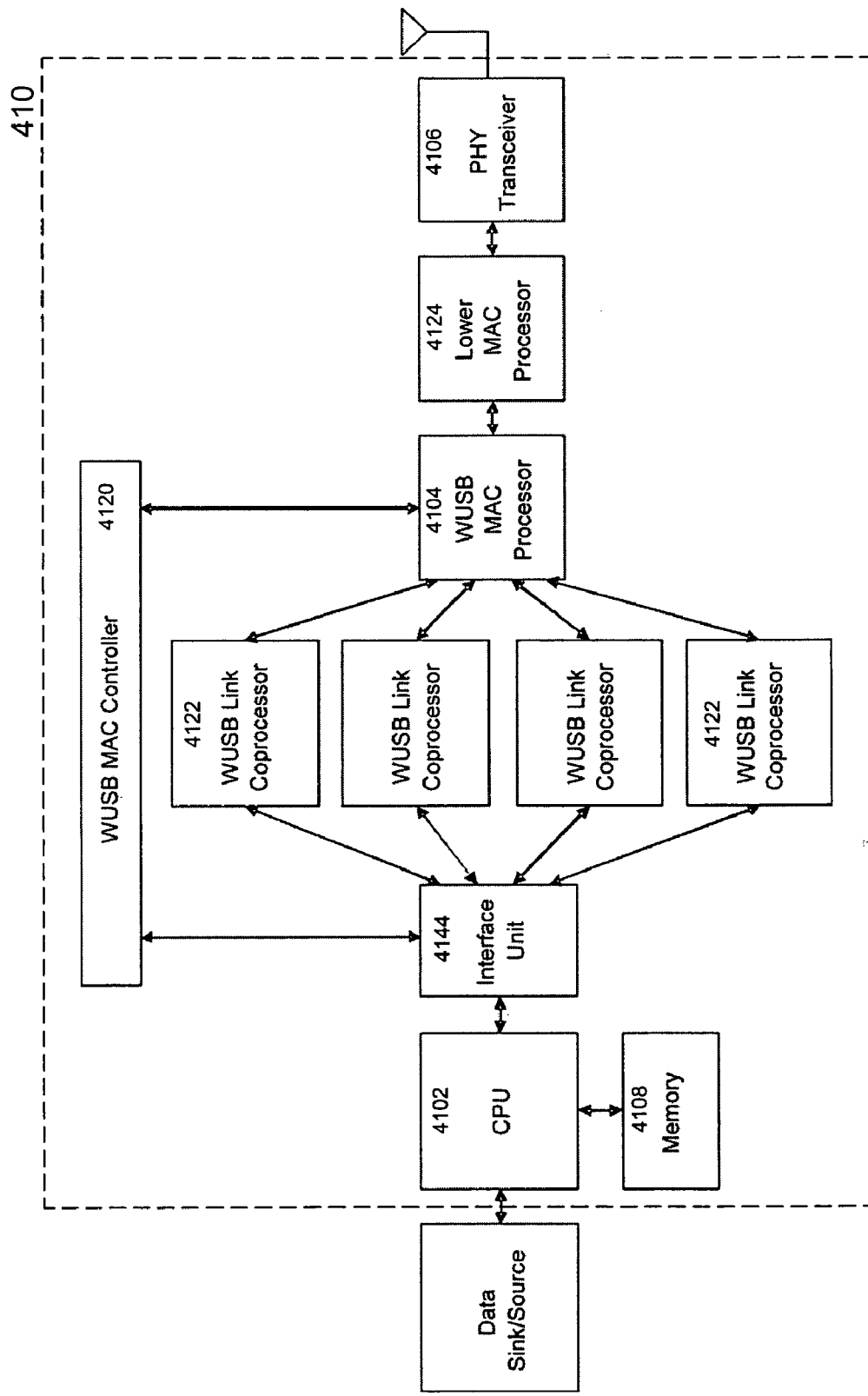
FIG. 12 is an exemplary arrangement showing a fourth preferred embodiment of this invention.

A fourth embodiment of this invention is shown in FIG. 12. This fourth embodiment is similar to that of the third embodiment except for the presence and/or connection of the following features which are described below.

WUSB MAC Processor 4104—this WUSB MAC Processor 4104 is responsible for handling reception and transmission of packets over Lower MAC Processor, decoding packet header, performing address filtering, decoding WUSB control management packets, handling out of order packet retrials for individual WUSB endpoint connections based on the information bases in WUSB Link Coprocessors, handling time-critical control and command packets and status processing, controlling WUSB packet transmission timing, and controlling Lower MAC Processor to switch PHY channel as well as performing channel scanning.

WUSB MAC Controller 4120—the WUSB MAC Controller 4120 is for communication with the WUSB MAC processor 4104 to handle channel scanning and PHY channel control. It is also for initializing WUSB MAC function blocks after power up as well as handling power control function.

WUSB Link Coprocessor 4122—the WUSB Link Coprocessor 4122 contain state machine for tracking WUSB device transfer and control status. In addition it is also for storing individual WUSB host connection information and managing device endpoints status. More particularly, each WUSB Link Coprocessor is associated with one host, and contains the connection information to that host. It is also for decoding commands and data from the CPU to individual device endpoints.

Interface Unit 4144—Interface Unit 4144 is for handling data transfers and for controlling communications between CPU 4102 and WUSB Link Coprocessors 4122 and WUSB MAC Controller 4120.

The WUSB device server 410 comprises a plurality of WUSB Link Coprocessors 4122. Each of the WUSB Link Coprocessors has a state machine for keeping track on the transfer and connection status of the device server with respect to the associated WUSB host. Each WUSB Link Coprocessor is associated with one and only one WUSB host. No WUSB host can be associated with more than one WUSB Link Coprocessor. In this example, there are four WUSB Link Coprocessors (4122) in the device server which means that the device server can connect to four WUSB hosts. At a circuitry level, it will be appreciated that the core of the WUSB device server is the implementation of multiple WUSB Link Coprocessors on the same MAC chipset for supporting more than one WUSB host connection simultaneously. This differs significantly with a conventional device in which there is only one WUSB link coprocessor or equivalent unit so that only one WUSB host connection can be supported at a time.

In the exemplary systems described above, it will be noted that the WUSB hosts share the same transmission media in a TDMA manner to communicate with their devices. Consequently, a plurality of WUSB link coprocessors in the communication interface can be designed to a single WUSB MAC processor, a single Lower MAC processor and the same PHY transceiver for communicating with more than one WUSB host.

When communicating with the connected host or hosts, the device can use the following ways to scan for a host.

a) Scanning hosts on the same PHY channel

The device monitors the un-reserved time slots in a superframe to look for MMCs from the other hosts on the same PHY channel. Upon reception of a MMC from a new host, the device will check if the MMC contains the connection information for the tentative host. If the checking result is positive, the device will send a device connection notification to the tentative host in the time slot reserved by the tentative host and will then go through authentication and bus enumeration processes to establish secure connection.

b) Scanning hosts on the other PHY channel:

In some circumstances, it is desirable to define communications between a plurality of hosts and a device on a single physical layer, even though the system is adapted to operate in several physical channels, for example, by frequency division multiplexing. In such circumstance, the following host scanning mode would be preferred.

In this mode, the device server will scan for a host on another PHY channel (PHY channel B) for a pre-determined number of super-frames under user predefined conditions, after the device has been connected to the first host on a first PHY channel (PHY channel A). The PHY channel B can be selected from user pre-set PHY channels in a round robin manner or based on other user-defined selection schemes.

At the beginning of each scan on PHY channel B, the device will start a scan timeout timer of a pre-defined duration and monitor PHY channel B for a pre-determined duration, for example, $N_{SCAN}$ super-frames, where $N_{SCAN}$ is a user-defined integer. That pre-determined duration, $t=N_{SCAN} \times 65.536$ ms, should be less than the WUSB trust timeout period to prevent the device from being disconnected by the connected host due to the WUSB trust timeout.

Figure 13:
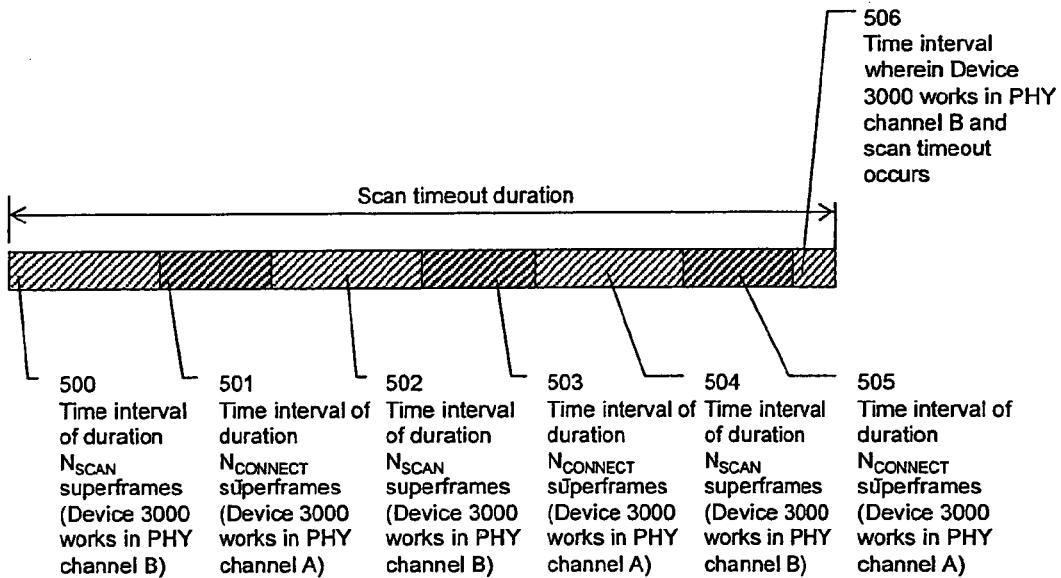
FIG. 13 is a schematic timing diagram showing operation of a device in a single physical channel PHY A.

After $N_{SCAN}$ super-frames, the device will switch back to PHY channel A and will communicate with the first connected host for $N_{CONNECT}$ super-frames, where $N_{CONNECT}$ is another user-defined integer. Again, the connection time, $N_{CONNECT} \times 65.536$ ms, should be less than the WUSB trust timeout period to prevent the device 3000 from being disconnected by a new second host that the device is trying to connect to on PHY channel B due to the WUSB trust timeout. The device will switch alternatively between PHY channels A and B after respectively $N_{SCAN}$ super-frames and $N_{SCAN}$ super-frames until a scan timeout occurs, as illustrated in FIG. 13. By this periodic channel switching operations, the device can communicate with the first connected host on PHY channel A while scanning on PHY channel B during the scan period to seek connection with the second, new, host.

Upon reception of a MMC from a new host on PHY channel B, the device will seek confirmation on the connection information of the potential new host. If the confirmation is successful, the device will send a device notification to the new host at the time interval specified in the received MMC and conducts authentication and bus enumeration to establish communication with the new host.

After having connected to the new host, the device will keep sending notifications and sending created neighbour beacon information to the new host to inform the new host that the current PHY channel is of a bad link quality and that the time slots reserved by the new host are being used by other hosts. The sending of such notifications and beacon information will last until the new host decides to change the PHY channel or until the trust timeout occurs. In the former case, if the new host decides to change to PHY channel A, the device server stops scan timeout timer and returns to PHY channel A immediately to communicate with the new host and the former first connected host.

If the new host decides to move to the yet another PHY channel, say PHY channel C, the device will continue sending out bad channel notifications and created neighbour beacon information to the new host to force it to perform another PHY channel change. If this happens, the device will keep repeating the above steps until the new host decides to change the PHY channel to PHY channel A or when the scan timeout occurs. In the former case, the device will stop the scan timeout timer and set the scan timeout. Whenever a scan timeout occurs, the device will return to PHY channel A to complete a host scanning.

Figure 14:
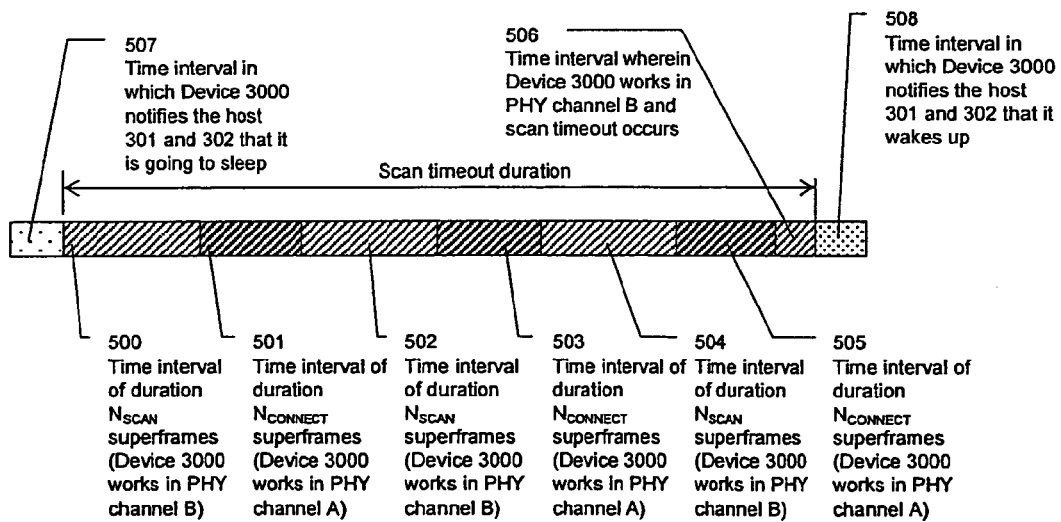
FIG. 14 is a schematic time diagram illustrating host scanning by a device 3000 on PHY with sleep mode is activated.

In an alternative host scanning mode as depicted in FIG. 14, the device will send notifications to the connected host at a time interval before the host scan time interval to tell the first connected host that it is going to sleep. During the scan period, the device will keep updating the connected host that it is going to sleep. After scan timeout occurs, the device will notify the connected host that it has waken up and will then communicate with the first connected host as an active device thereafter.

Figure 15:
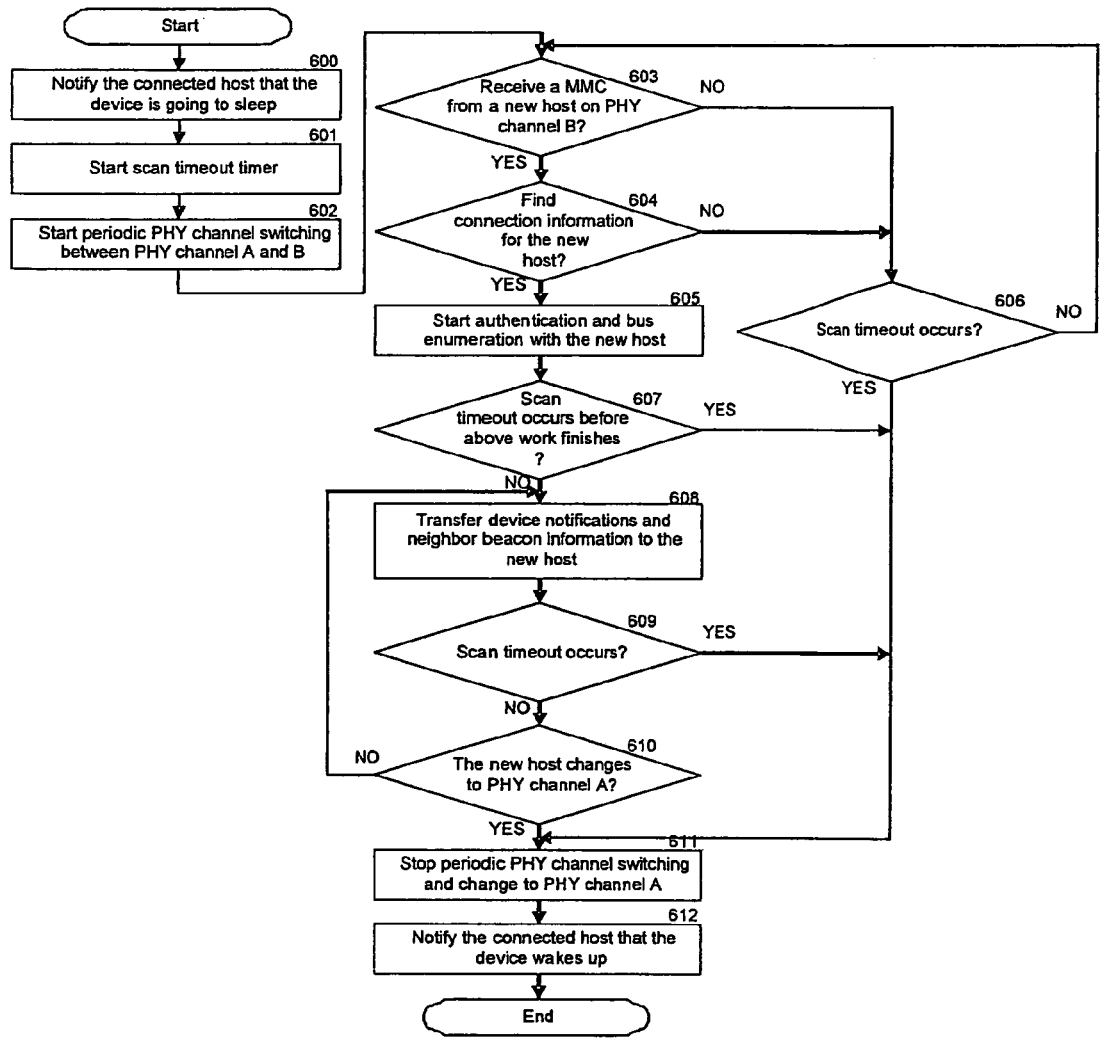
FIG. 15 is a flow diagram showing an exemplary operational flow for host scanning in PHY B when the device is already connected to a host on PHY A.

FIG. 15 is a flow chart illustrating the host scanning process by the device in PHY channel B. The operation 600 and 612 can be skipped if the device does not perform host scanning in the sleep mode. As mentioned above, host scanning will stop once the device has been connected with a new host on PHY channel B and the new host has decided to change its PHY channel to A. In general, the host scanning process will continue until scan timeout occurs, and if this happens, the YES output of the decision 610 should be connected to decision block 603 instead of the operation block 611.

The host scanning operations described above are based on the assumption that the device does not communicate with hosts on different PHY channels at the same time. Of course, the device 3000 can be configured to communicate with a plurality of hosts on different PHY channels, say, A and B, as shown in FIG. 16 at the same time. In such a case, the operations 608, 609 and 610 can be skipped.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention. More particularly, while the present invention has been exemplified by a WUSB device server having a direct connection to a device function unit, it will be appreciated that the WUSB device server can be provided with a communication interface so that the WUSB device server can communicate with a USB device via the communication interface similar to that employed in a standard DWA (device wire adapter) so that the WUSB device server can operate with a standard USB device when necessary or desirable.

Furthermore, while the present invention has been explained by reference to a WUSB system, it should be appreciated that the invention can apply, whether with or without modification, to other data communications systems without loss of generality.

The invention claimed is:

1. A communication interface for connecting a plurality of wireless USB (WUSB) compatible hosts for data communication with at least one device endpoint in a WUSB environment, said communication interface comprising:
   host detection means for detecting the presence of two or more active hosts from a plurality of active hosts,
   host communication means for establishing WUSB connections between a device endpoint and a first active host and between a further active host of the plurality of hosts, and
   a controller for establishing a connection between a first active host and the device endpoint on a first physical communication channel for data communication therebetween; for detecting the presence of a further active host on a different physical communication channel to said first communication channel while maintaining the connection between said first active host and the device endpoint on said first physical communication channel; and for establishing a connection on said first physical communication channel between said further active host and said device endpoint for data communication therebetween,
   wherein upon issuance of notifications from said device endpoint to said further active host, said further active host changes channels until connection is established between said further active host and said device endpoint on said first physical communication channel.

2. The communication interface according to claim 1, wherein: data communication between said active hosts and said at least-one-device endpoint is by time division multiplexing (TDM).

3. The communication interface according to claim 1, wherein:
   each one of said active hosts is a WUSB host responsible for reserving time slots in the physical communication channel and for initiating data transfers to a device endpoint.

4. The communication interface according to claim 3, wherein:
said controller is further adapted so that said hosts and said device endpoint communicate on a common wireless physical channel using time division multiplexed access.

5. The communication interface according to claim 4, wherein:
said common wireless physical channel is arranged into super-frames, each super-frame is arranged into 256 media access slots, and each said media access slot has a duration of 256 µs.

6. The communication interface according to claim 3, wherein:
said controller is adapted so that said hosts communicate with said interface on different physical channels using time division multiplexed access.

7. The communication interface according to claim 3, wherein:
each one of said active WUSB hosts sends out host identifying information repeatedly, and
said host communication means of said interface comprises means for detecting said host identifying information, and wherein, data communication link with an active host can be established upon detection of said host identification information of said active WUSB host.

8. The communication interface according to claim 7, wherein said controller is configured so that, upon establishing of a data communication link between said plurality of active hosts and said at least one device endpoint, data from said plurality of hosts are sequentially communicated wherein data from a host are communicated following the host identification information of that host and before the host identification information of the same or the next host.

9. The communication interface according to claim 8, wherein a plurality of data packets of an active host are communicated before the host identification information of the same host or the next host is communicated on said wireless physical channel.

10. The communication interface according to claim 7, wherein:
said active hosts and said at least one device endpoint communicate on a common wireless physical channel, and
said means for detecting said host identifying information comprises means to scan said wireless physical channel for detecting a presence of an active host.

11. The communication interface according to claim 7, wherein:
said host identifying information contains packets of control and/or command information.

12. The interface according to claim 7, further comprising a plurality of transceivers for communicating with a plurality of hosts on a plurality of physical channels.

13. A method of connecting a plurality of wireless USB (WUSB) compatible hosts with at least one device endpoint in a WUSB environment, said method comprising:
establishing a WUSB connection with a first active host for data communication, and
detecting a presence of a further active host from a plurality of active hosts for data communication between the device endpoint and said further active host while said communication interface maintains data connection and data communication with the first active host,
wherein said first active host is connected to the at least one device endpoint on a first physical communication channel and
wherein a connection is established between said further active host to the at least one device endpoint via the first physical communication channel upon issuance of notifications from said device endpoint to said further active host, such that said further active host changes channels until connection is established between said further active host and said device endpoint on said first physical communication channel.

14. The method according to claim 13, wherein:
data communication between said WUSB hosts and said at least one device endpoint is by time division multiplexing (TDM) of data.

15. A communication system comprising a plurality of active hosts, at least one device endpoint and a communication interface, wherein:
each of said plurality of active hosts communicates with said device endpoint by data communication through said communication interface, and
each one of said active hosts assigns an address to said device endpoint and is for initializing data transfer to said device endpoint through said communication interface;
and wherein
said communication interface comprises:
i. host detection means for detecting the presence of two or more active host from a plurality of active hosts,
ii. host communication means for establishing a WUSB connection between the device endpoint and a first active host, and between a further active host of the plurality of active hosts, and
iii. a controller for establishing a connection between a first active host and the device endpoint on a first physical communication channel for data communication therebetween;
for detecting the presence of a further active host on a different physical communication channel to said first communication channel while maintaining connection between said first active host and the device endpoint on said first physical communication channel,
wherein upon issuance of bad data link notifications from said device endpoint to said further active host, said further active host changes channels until connection is established between said further active host and said device endpoint on said first physical communication channel.

16. The communication system according to claim 15, wherein:
said controller comprises means for causing time division multiplexed (TDM) data communication between said hosts and said at least one device endpoint.

17. The communication interface according to claim 1, wherein the communication interface is included in the at least one device endpoint.

* * * * *